UNITED STATES PATENT OFFICE.

WILLIAM ELMER, OF NEW YORK, N. Y.

IMPROVEMENT IN THE MANUFACTURE OF ILLUMINATING-GAS.

Specification forming part of Letters Patent No. 141,500, dated August 5, 1873; application filed November 22, 1872.

*To all whom it may concern:*

Be it known that I, WILLIAM ELMER, of the city, county, and State of New York, have invented a new Method of Making Illuminating-Gas, of which the following is a specification:

This invention relates to a method, herein particularly described, of combining, in the process of manufacture, with gas, so made from coal or other hydrocarbon as not to give the desired amount of light in burning, additional carbon, whereby its illuminating power is increased.

It is known that bituminous coal, wood, peat, bitumen, and other hydrocarbon substances containing volatilizable constituents are capable of yielding, upon complete distinctive distillation, a much larger quantity of gas than is obtained by the methods ordinarily employed in manufacturing illuminating-gas. But it is also known that, under any of the methods heretofore employed, an increase in the volume of the gas beyond that commonly obtained, say, nine to ten thousand cubic feet from a ton of ordinary gas-coal, is always accomplished at the expense of its illuminating power. The basic, inflammable, gaseous, heat-producing element in these hydrocarbons is hydrogen, which exists therein in various proportional combinations with the other elements, chiefly with oxygen and carbon. The effects of a certain moderate heat upon these various combinations is simply to convert them into vapor, which, upon cooling, falls back again into a fluid or solid form, the chemical relations of the constituents remaining nearly the same. A certain higher degree of heat decomposes some of these combinations, their elements entering into new relations, forming compounds that permanently retain the gaseous form upon cooling, while the others may still remain condensable, yielding only to a still higher heat, and all severally yielding and becoming decomposed at various degrees of heat. As this process of decomposition goes on the carbon, one of the constituents of the several combinations, is proportionately set free, leaving the resulting gas more and more purely hydrogen and deficient in the illuminating element.

The object aimed at in all the methods of making illuminating-gas hitherto practiced is the subjection of the gas-stock to just that degree and continuance of heat that will effect the production, by decomposition of these compounds, of the largest possible volume of fixed gas containing the requisite carbon to give it sufficient illuminating power. Practically it has been found that the heat best adapted to produce this result is not above 1,500 to 2,000° Fahrenheit, and that when such decomposition as that heat will effect has been accomplished the resulting fixed gas should be allowed to escape as quickly as possible from the heated retort into a lower temperature; otherwise a decomposition of this resulting gas takes place, and a portion of its carbon is deposited. If a degree of heat much above that named above is applied, or the resulting fixed gas is permitted to continue subjected for any considerable time, even to that degree of heat, the inevitable consequence is that the process of decomposition will be carried so far as to set free too much of the carbon, and thus impair the illuminating quality of the gas. Now, I have discovered a method whereby all the volatile compounds contained in the hydrocarbons named may be converted into fixed inflammable gases by the application of high heat, while in the process a sufficient amount of carbon is retained therein or imparted thereto to constitute the product light-giving gas of a high illuminating power.

I will proceed to describe it in general terms: The first stage of the process may be described as consisting in eliminating, by distillation, the volatile matter contained in coal, wood, peat, bitumen, and other hydrocarbons or substances capable of yielding volatile products, and subjecting the distillate from the substances while in the volatile form, and without the loss of the heat it has aquired in the process, and without the loss of its volatile condition by condensation, to a heat sufficiently high to convert the volatile products into fixed gas. The second stage of the process consists in introducing, into the above-mentioned products of the distillation, while, at a high heat in a separate retort or a series of retorts, they are undergoing conversion into fixed gas, the volatile constituents of a hydrocarbon placed and distilled immediately in such separate highly-heated retort, or series of retorts, whereby the great volume of gases that are very inflammable, but of feeble illuminating power, into which the products of the first distillation are converted by the high heat, are enriched with carbon and rendered highly illuminating.

In the practical application of my invention I employ three retorts, one of which may be of iron, the other two of clay. I do not, however, confine the process to any number of retorts, or to any particular form or size of retorts, or the kind of material of which they are made; but in order to enable others skilled in the art of generating illuminating-gas to use my invention, I will describe it by the use of three retorts, two of which are clay, the other of iron. The retorts are set in brickwork in what is technically termed a "bench." The clay retorts are connected with each other at the back end by means of a tube. The iron retort is connected with one of the clay retorts by means of pipes attached to the mouth-piece of each. To the mouth-piece of the other clay retort are attached the ordinary stand and bridge, pipes connecting the retort with the hydraulic main in the usual manner. Two sets of these retorts may be arranged in one bench, so as to economize the fuel employed in maintaining the heat of the retorts. The material to be subjected to the process of distillation at a moderate heat is placed in the iron retort, and subjected to a temperature adapted to the nature of the substances employed, and sufficient to eliminate the volatile matter contained in the same, and the volatile matter thus formed is conveyed, without the loss of heat or condition of form, directly into the clay retorts, where it is subjected to a temperature sufficiently high—say 2,500 to 2,700° Fahrenheit—to convert it into gas. At the same time a small quantity of gas-coal of good quality is introduced into the clay retort, to which the stand-pipe is connected, say a quantity equal to one-eighth of the charge in the iron retort. In the chemical reaction that takes place in the process, the volatized products evolved by distillation from the material contained in the iron retort, under the high heat of the clay retorts, assume the gaseous form, and the gas thus formed is enabled to retain or have imparted to it, by means of the volatile matter given off from the coal in this retort, sufficient carbon to form good illuminating-gas. By this means I utilize and obtain, in a gaseous condition, the most of the hydrogen and carbon contained in the volatile matter given off from coal or other material contained in the iron retort, and convert them into useful illuminating-gas. In the place of coal any other suitable hydrocarbon may be employed for distillation in the clay retort.

In the distillation of coal by the ordinary process for the production of illuminating-gas, it is well known that a large waste of hydrogen and carbon occurs in consequence of the formation of numerous compounds other than gaseous, and these compounds not only constitute a great waste of carbon and hydrogen, the very elements upon which the production of illuminating-gas depends, but are also a source of annoyance in the manufacture of gas. The quantity of hydrogen contained in these compounds is much larger than exists in the gas obtained by the ordinary process, and when it is remembered that it is the hydrogen on which the volume of gas mainly depends, it is evident that its appropriation, in the formation of compounds other than gaseous, constitutes an enormous waste of the very element required for the production of gas. Now, these condensable hydrocarbon compounds, which have escaped conversion into gas and assumed other forms, were, when eliminated from the coal, in the volatile form, and therefore susceptible of conversion into gas by proper means; but when they lose this condition and become condensed into solid and semi-solid forms, they are no longer available to any great extent for the production of gas, and especially are the solid products a complete waste of the very elements required for the production of gas.

The object of my invention is to prevent, as much as possible, the formation of these condensable compounds, so as to utilize the hydrogen contained in the volatile products as well as a portion of the carbon evolved from coal and other substances employed in generating illuminating-gas, and this I accomplish by the means herein set forth.

What I claim as my invention, and desire to secure by Letters Patent, is—

The process herein described of manufacturing illuminating-gas by first distilling the gas-stock in one retort at a comparatively low heat, then decomposing the resulting distillates into hydrogen and carbonic oxide in a separate retort at a high heat, not less than 2,000° Fahrenheit, and then causing the resulting gases, immediately before leaving the said highly-heated retort, to pass over or through crude coal, or its equivalent, deposited for the purpose therein and near the point of exit of the gas, whereby the inflammable but non-illuminating gases generated under the said high heat take up and combine with themselves, while under the action of such heat, a portion of carbon, thereby converting them into useful illuminating-gas, substantially as described.

WILLIAM ELMER.

Witnesses:
  J. P. FITCH,
  A. LIVINGSTON MILLS.